G. MERTELMEYER & H. KOESTER.
REGULATING APPARATUS.
APPLICATION FILED APR. 28, 1915.
1,203,230.
Patented Oct. 31, 1916.
2 SHEETS—SHEET 2.
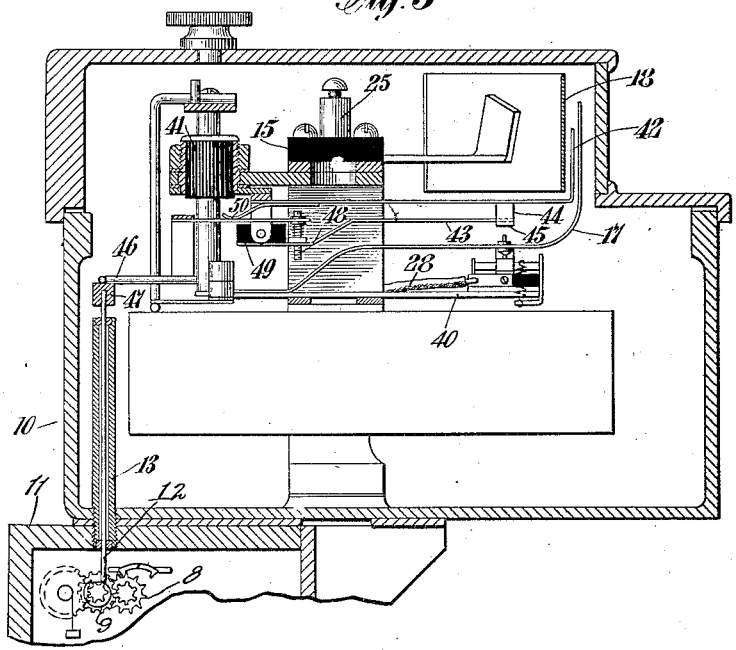
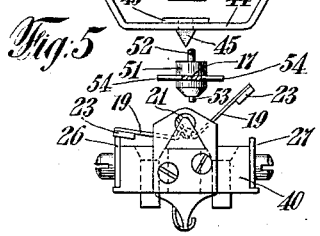
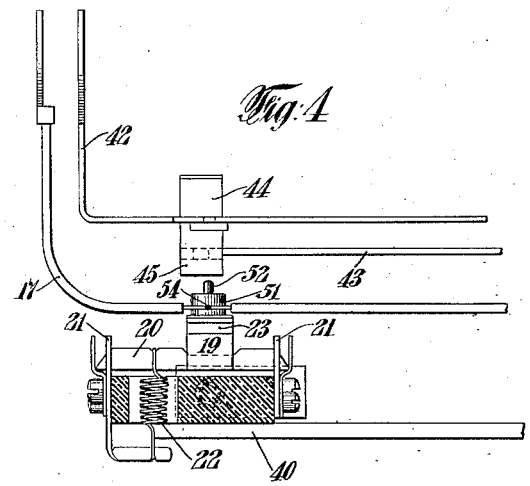
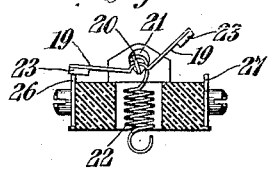
INVENTORS
Gisbert Mertelmeyer
Herman Koester
BY Fred'k F. Schuetz
ATTORNEY

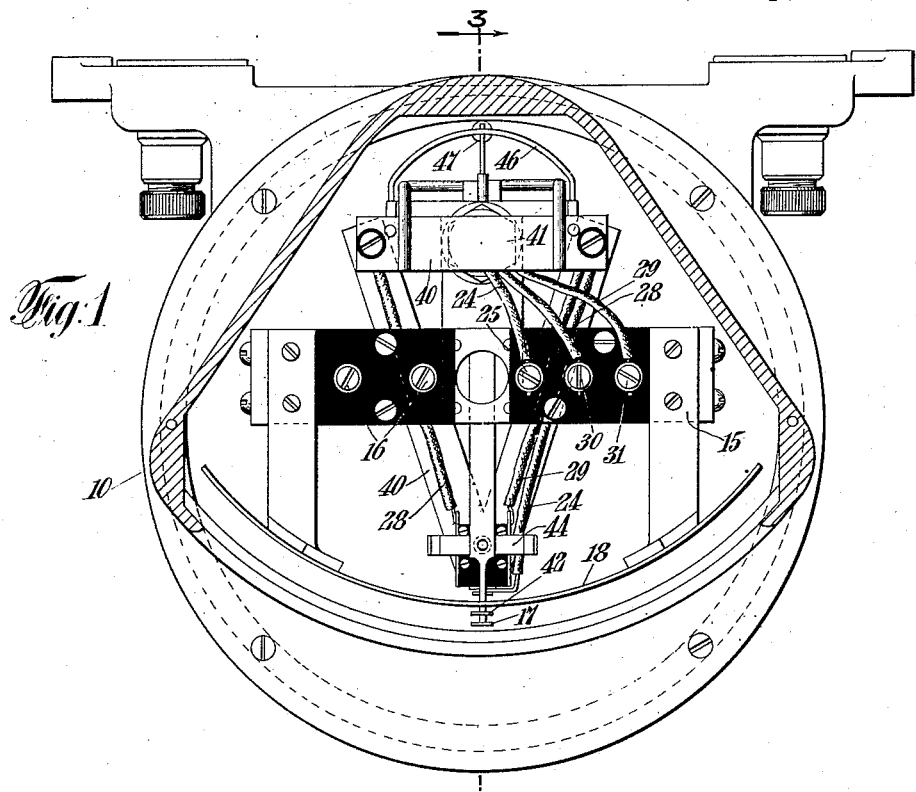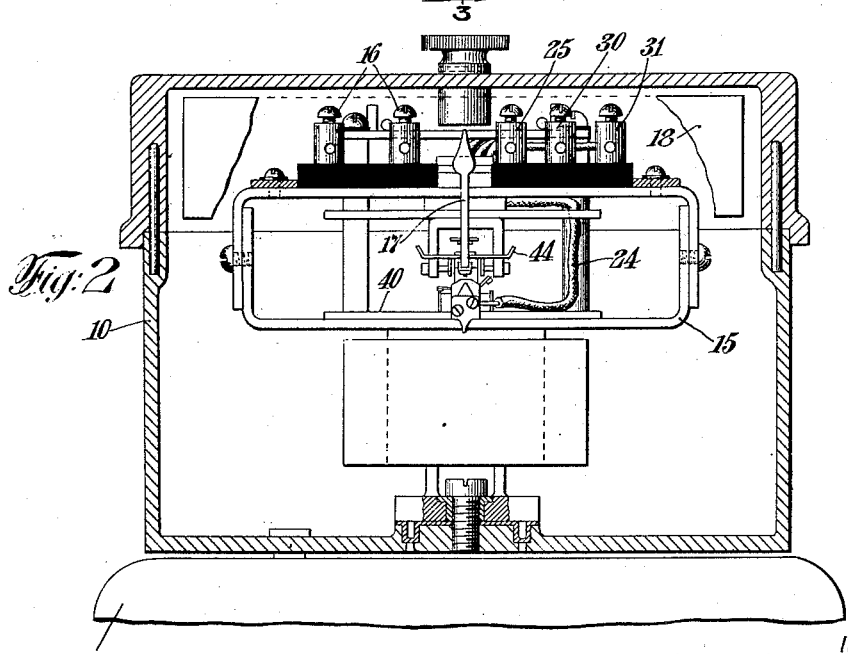

UNITED STATES PATENT OFFICE.

GISBERT MERTELMEYER AND HERMAN KOESTER, OF WATERBURY, CONNECTICUT, ASSIGNORS TO THE BRISTOL COMPANY, OF WATERBURY, CONNECTICUT, A CORPORATION OF CONNECTICUT.

REGULATING APPARATUS.

1,203,230.  Specification of Letters Patent.  Patented Oct. 31, 1916.

Application filed April 28, 1915.  Serial No. 24,426.

*To all whom it may concern:*

Be it known that we, GISBERT MERTELMEYER, a former citizen of the German Empire, (who has declared his intention of becoming a citizen of the United States,) and HERMAN KOESTER, a citizen of the United States, both residents of Waterbury, in the county of New Haven and State of Connecticut, have invented certain new and useful Improvements in Regulating Apparatus, of which the following is a specification.

The invention relates to automatic regulating apparatus, and more particularly to electrical contact making means operated through the instrumentality of certain external conditions which in turn may be controlled through the action of the said contact means. Or, said contact means may serve to control other mechanism or conditions.

The invention has for its object to provide substantial and positive contact making means which shall be automatically controlled by mechanism under the influence of some condition as of temperature, pressure motion and the like; and which condition it may be desired to maintain thereby or to alter in accordance with a predetermined plan. The apparatus is particularly suitable for use where the actuating power of the mechanism under said influence is weak and a regulating member operated thereby too delicate to effect a positive direct electrical contact, or where it is not feasible so to do. The controlling mechanism for the contact making means is so designed, moreover, that it will maintain no "dead center" position in its action, insuring thereby reliability of operation of the said contact making means and which latter, furthermore, is designed to be placed directly under the influence of a definite and sufficiently great tension to afford a positive contact.

It has for a further object to avoid conducting the controlling current of electricity through the regulating arm or measuring pointer of the actuating mechanism, in that the said arm is employed merely as an intermediate member to determine the positioning of the contact making means. The said contact making means, therefore, may be of substantial proportions and suitable, generally, to directly control a sufficiently large operating current rather than indirectly as has heretofore been the practice.

The nature of the invention will be best understood when described in connection with the accompanying drawings, in which—

Figure 1 is a plan of the apparatus with upper portion of casing removed. Fig. 2 is a front elevation with a portion of the casing and the scale removed. Fig. 3 is a vertical section taken on the line 3—3, Fig. 1. Figs. 4, 5 and 6 are fragmentary detail views of the contact mechanism.

Similar characters of reference designate corresponding parts throughout the several views.

Referring to the drawings, 10 designates the instrument casing mounted upon a further casing 11 and which latter is designed to contain a suitable clock or motor mechanism 8 driving a cam 9 adapted to periodically reciprocate a rod 12. This rod extends upwardly through a suitable guide 13 into the instrument casing 10 to effect the actuation of the contact making means, as will be hereinafter more fully set forth.

In the casing 10 is rigidly mounted a frame 15 carrying suitable binding posts 16 to which connection may be made to electrical controlling mechanism (not shown) for operating an arm 17. The latter may serve, if desired, also as a measuring pointer being adapted to move, as is well understood, before a graduated scale 18 fixedly attached to the said frame 15. It will be understood, of course, that the arm 17 may be operated by any of the well known means for measuring temperature, pressure, motion and the like; and the mechanism employed for effecting the movement of said arm forms no part of the present invention which relates more particularly to the employment of such arm to determine the positioning of the contact making means. The latter consists merely of two oppositely disposed arms 19 carried by a knife edge or blade 20 which is pivotally mounted in oppositely disposed V-shaped members 21 and designed through the action of a spring 22 to be positively held in position to one side or the other of a neutral vertical position. The spring 22 is tensioned sufficiently to insure a positive contact between outer terminal pieces 23, connected through a suitable lead 24 to a binding post 25, and contact pieces 26 and 27 which are disposed upon opposite sides of the blade 20, accordingly as the said arms are rocked to one side or the other. The contact pieces 26 and 27 are, through conductors 28 and 29, connected respectively to binding posts 30 and 31; and from the binding posts 16, 25, 30 and 31 outside connection is made, as is well understood. The connections to the binding posts 16 are for the purpose of introducing the operating current for the measuring pointer 17 and the connections to the binding posts 25, 30 and 31 are for the purpose of controlling electrically some distant mechanism or some condition and which condition in turn may control the motion of the said measuring pointer 17.

Contact arms 19 and coöperating parts are carried by a movable frame 40 mounted to move about a stud 41 of the frame 15 and whose axis coincides with the axis of oscillation of the measuring pointer 17 as well as with the axis of its circular scale 18. At its outer end, the frame 40 is provided with an upwardly extending setting pointer 42 located in proximity to the scale 18 and directly in front of the same. By this means, the contact mechanism may be variously set to correspond to different conditions and which will be indicated by the position of its pointer 42 relatively to the scale 18. It will be understood, of course, that no movement of the frame 40 is communicated to the measuring pointer 17 which is independently actuated as hereinbefore set forth. The said arm or measuring pointer 17, however, is arranged to be periodically depressed at its forward end through the instrumentality of an outwardly extending lever 43 pivotally attached to the frame 40 and provided at its outer extremity with a horizontal cross-piece 44 having upturned ends and a V-shaped piece 45, the latter extending downwardly from said piece midway of its ends. At its inner end, the lever 43 carries a semi-annular piece 46 adapted to be periodically raised by engagement with a block 47 attached to the upper end of the reciprocating rod 12 which derives its motion as hereinbefore set forth, the circular shape of the piece 46 insuring positive contact between said lever and block in any position in which the frame 40 may be set. To adjust the normal position of lever 43 for a correct throw when the same is depressed, a screw 48 is arranged to work therein against the pivoting block 49 of said lever. The return of said lever is insured by the action of a flat spring 50 attached to the said underface of the setting pointer 42 and pressing down upon the inner arm portion of the lever. The lever 43, or rather its cross-piece 44, is thereby normally held above the measuring pointer 17, as will be best seen in Figs. 4 and 5, and is only depressed periodically by the means hereinbefore described to temporarily contact with the said pointer 17 which is otherwise perfectly free to move.

The pointer 17 is provided with an insulation piece 51 through which passes an insulation pin rounded at its upper projecting end 52 which is adjusted for engagement with the edge of the V-shaped piece 45. The said piece 45, as the lever 43 is depressed, serves in conjunction with the said pin 52 to guide or deflect the pointer 17 to one side or the other due to the tendency of said pointer to vibrate slightly because of its delicate mounting. This insures against a "dead center" position of the parts and a positive action upon the contact making means by the strongly actuated lever 43 which acts through the projecting lower end 53 of said pin or the insulation piece 51, or both. Said insulation piece and end are designed to contact, upon the further descent of the lever 43, with one of the arms 19 of the contact making means to throw an arm to the corresponding side and thus change the connection, if not already in the proper position. The end 53 of the insulated pin is adjusted so that even in its highest or free position it will not pass over an elevated contact arm. Even with very rapid and extensive fluctuations the movable arm is forced to first cause the proper arm of the switch to be pressed down, as well as when adjusting the setting pointer 42.

It will be understood that the arm or pointer 17, which may be under the influence of the conditions controlled by the contact making means, will move, while regulating, normally toward the arm 19 thereof which is elevated, and away from the arm which is in contact with a corresponding contact piece 26, or 27. The regulation of the condition determined by the position in which the pointer 42 is set will thus be held within close limits. Should it occur, however, that the pointer 17 for any reason has passed beyond one of the arms in elevated position, it would ordinarily on its return movement be unable to pass said arm to shift the contact when the lever 43 is depressed. To overcome such contingency and to positively insure the actuation of the contact making means under all conditions, an insulated pin 54 is provided to extend laterally from both sides of the block 51, being so located as to ride above the elevated contact arms as the pointer 17 moves toward the same. Therefore, when the depression of said pointer occurs, one end of the pin will engage with a corresponding arm 19 and effect the reversal of the contacts; and the pointer will then be free to move into position between the two said arms and perform its function of regulation.

For example, when the apparatus is employed in connection with the automatic regulation of the temperature of a gas fired furnace, the contacts would be used to control the circuits of suitable gas and air supplying valves. In starting to heat the furnace, a gradual rise in temperature of the same would effect a movement of the pointer 17, the actual temperature being indicated by its position relatively to the scale 18, toward the position to which the setting pointer 42 has been adjusted and which position would correspond to the particular temperature at which the furnace is to be held. Normally, the pointer 17 would reach a position between the arms 19, no contact action being effected by the depression of lever 43 as the proper contact has remained for maximum supply of the gas. So soon, however, as the pointer 17 passes the position corresponding to the temperature to which the setting pointer 42 is adjusted (V-shape piece 45) the said pointer 17 in being depressed will be deflected slightly toward the side of the elevated arm 19; and upon further descent of said lever 43, the block 51 or lower end 53 of the insulated pin, or both, will contact with the said elevated arm and force the same downwardly to close the contact at 27 which thereby effects a reduction in the supply of gas. The movement of the pointer then reverses due to the cooling of the furnace and eventually engages the opposite arm 19 of the contact making mechanism which has been elevated and depresses the same to close the contact at 26, which in turn will restore the maximum supply of fuel.

We claim:—

1. Regulating apparatus, comprising: a two arm and movable electrical switch and two contacts therefor, one arm of the switch being adapted to engage a corresponding contact when the other arm is disengaged from its corresponding contact, and vice versa; a movable arm associated with said switch and controlled by an external condition; and means acting on said arm to cause the same to directly engage one of the said switch arms and move the latter to change the contact.

2. Regulating apparatus, comprising: a two arm and movable electrical switch and two contacts therefor, one arm of the switch being adapted to engage a corresponding contact when the other arm is disengaged from its corresponding contact, and vice versa; a movable arm associated with said switch and controlled by an external condition; and means to periodically depress said arm to cause the same to engage one of the said switch arms and move the latter to change the contact.

3. Regulating apparatus, comprising: a pivotally mounted two-arm electrical switch and two contacts therefor, one arm of the switch engaging a corresponding contact when the other arm is disengaged from its corresponding contact, and vice versa; a spring acting on said switch to hold an arm thereof on its corresponding contact; a measuring arm associated with said switch; a scale coöperating with said measuring arm; and means acting on said arm to cause the same to directly actuate the contact making means.

4. Regulating apparatus comprising: contact making means; a setting pointer attached thereto; a scale coöperating with said pointer; a movable arm associated with said contact making means and controlled by an external condition; a movable frame carrying said contact making means; a lever pivotally attached thereto, its forward end being adapted to engage the said movable arm; and means to periodically depress said lever to thereby depress the said arm and through the latter to actuate the contact making means.

5. Regulating apparatus, comprising: contact making means; a setting pointer attached thereto; a scale coöperating with said pointer; a movable arm associated with said contact making means and controlled by an external condition; a movable frame carrying said contact making means; a periodically reciprocated member; a pivoted lever carried by said movable frame, its forward end being adapted to engage said movable arm to depress the latter and its inner end being provided with an arc-shape portion adapted to be engaged by said periodically reciprocated member to actuate said contact making means.

6. Regulating apparatus, comprising: contact making means; a setting pointer attached thereto; a scale coöperating with said pointer; a movable arm associated with said contact making means and controlled by an external condition; a movable frame carrying said contact making means; a pivoted lever carried by said movable frame and provided at its forward end and underface with a V-shape piece adapted to engage said movable arm; and means to periodically depress said lever to thereby depress the said arm and through the latter to actuate the contact making means.

7. Regulating apparatus, comprising: contact making means; a setting pointer attached thereto; a scale coöperating with said pointer; a movable arm associated with said contact making means and controlled by an external condition; an insulated upwardly extending pin at the outer end of said movable arm; a movable frame carrying said control making means; a pivoted lever carried by said movable frame and provided at its forward end and underface with a V-shape piece adapted to coact with said upwardly extending pin to deflect the movable arm to one side or the other; and means to periodically depress said lever to thereby depress the said arm and through the latter to actuate the contact making means.

8. Regulating apparatus, comprising: contact making means including two contact arms; a setting pointer attached thereto; a scale coöperating with said pointer; a movable arm associated with said contact making means and controlled by an external condition; an insulated upwardly extending pin at the outer end of said movable arm, and the lower end of which pin is adapted to engage an arm of the contact device; a movable frame carrying said contact making means; a pivoted lever carried by said movable frame and provided at its forward end and underface with a V-shape piece adapted to coact with said upwardly extending pin to deflect the movable arm to one side or the other; and means to periodically depress said lever to thereby depress the said arm and through the latter to actuate the contact making means.

9. Regulating apparatus, comprising: contact making means including two contact arms; a setting pointer attached thereto; a scale coöperating with said pointer; a movable arm associated with said contact making means and controlled by an external condition; an insulated upwardly extending pin at the outer end of said movable arm and the lower end of which pin is adapted to engage an arm of the contact device; a laterally extending pin at the outer end of said movable arm adapted to coact with the arms of said contact making means; a movable frame carrying said contact making means; a pivoted lever carried by said movable frame and provided at its forward end and underface with a V-shape piece adapted to coact with said upwardly extending pin to deflect the movable arm to one side or the other; and means to periodically depress said lever to thereby depress the said arm and through the latter to actuate the contact making means.

10. Regulating apparatus, comprising: contact making means; a setting pointer attached thereto; a scale coöperating with said pointer; a movable arm associated with said contact making means and controlled by an external condition; a movable frame carried by said contact making means; a lever pivotally attached thereto; means to adjust said lever relatively to said movable arm; and means to periodically depress said lever to thereby depress said arm and through the latter to actuate the contact making means.

11. Regulating apparatus, comprising: a pivotally mounted two-arm electrical switch and two contacts therefor, one arm of the switch engaging a corresponding contact when the other arm is disengaged from its corresponding contact, and vice versa; a spring acting on said switch to hold an arm thereof on its corresponding contact; a measuring arm associated with said switch; a scale coöperating with said measuring arm; a setting pointer attached to said switch mechanism and coöperating with said scale; an insulated upwardly extending pin at the outer end of said measuring arm and the lower end of which pin is adapted to engage an arm of the contact device; a laterally extending pin at the outer end of said measuring arm adapted to coact with the arms of said contact means; a movable frame carrying said contact means; a pivoted lever carried by said movable frame and provided at its forward end with a crosspiece and at its underface with a V-shape piece, the latter being adapted to coact with said upwardly extending pin to deflect the measuring arm to one side or the other and the former to engage the same to depress said arm; a reciprocatory rod; and an arc-shaped member carried by said pivoted lever and adapted to be engaged by said reciprocatory rod.

Signed at Waterbury, in the county of New Haven and State of Connecticut, this 24th day of April, 1915.

GISBERT MERTELMEYER.
HERMAN KOESTER.